(12) United States Patent
Keiser

(10) Patent No.: US 8,750,486 B1
(45) Date of Patent: Jun. 10, 2014

(54) CALL CENTER FOR OFFERING GOODS AND SERVICES TO AN INMATE POPULATION

(75) Inventor: Luke Keiser, Frisco, TX (US)

(73) Assignee: Securus Technologies, Inc., Dallas, TX (US)

( * ) Notice: Subject to any disclaimer, the term of this patent is extended or adjusted under 35 U.S.C. 154(b) by 339 days.

(21) Appl. No.: 12/975,077

(22) Filed: Dec. 21, 2010

(51) Int. Cl.
*H04M 3/00* (2006.01)

(52) U.S. Cl.
USPC ..................................... 379/265.01

(58) Field of Classification Search
USPC ..................................... 379/265.01
See application file for complete search history.

(56) References Cited

U.S. PATENT DOCUMENTS

| | | | | |
|---|---|---|---|---|
| 5,485,507 | A * | 1/1996 | Brown et al. | 379/88.08 |
| 7,529,357 | B1 * | 5/2009 | Rae et al. | 379/189 |
| 2005/0216555 | A1 * | 9/2005 | English et al. | 709/204 |
| 2006/0159060 | A1 * | 7/2006 | Fotta et al. | 370/351 |
| 2009/0063343 | A1 * | 3/2009 | Mertz et al. | 705/41 |
| 2009/0076832 | A1 * | 3/2009 | Collins | 705/1 |
| 2009/0093688 | A1 * | 4/2009 | Mathur | 600/300 |
| 2009/0125390 | A1 * | 5/2009 | Rokosky et al. | 705/14 |
| 2009/0325666 | A1 * | 12/2009 | Salmon | 463/16 |
| 2010/0273487 | A1 * | 10/2010 | Alonso-Rubio et al. | 455/436 |
| 2011/0188648 | A1 * | 8/2011 | Pickering et al. | 379/211.02 |
| 2012/0071100 | A1 * | 3/2012 | Fadell | 455/41.2 |

* cited by examiner

*Primary Examiner* — Creighton Smith
(74) *Attorney, Agent, or Firm* — Fogarty, L.L.C.

(57) ABSTRACT

A call center for an inmate at a correctional facility is disclosed. The call center services inmate calls and coordinates inmate purchases of goods and services. The call center is staffed by live operators who are connected to the inmates. The live operators are provided with inmate data, such as personal and family information and sentencing data. A vendor agent terminal displays the inmate data. The operator may suggest goods and services of interest to the inmate based upon the inmate data. The inmate may be charged a fee to access the live-operator vendor service. Alternatively or additionally, the inmate may be charged a per-minute fee to access the vendor call center. The vendor call center or a detention facility call processing system may provide warnings to the inmate regarding an elapsed call duration, a time remaining on the call, or a fee amount due to continue the call.

20 Claims, 2 Drawing Sheets

US 8,750,486 B1

CALL CENTER FOR OFFERING GOODS AND SERVICES TO AN INMATE POPULATION

TECHNICAL FIELD

Embodiments of the invention are directed to the process by which detainees in a correctional facility are routed to a specified vendor IVR or vendor call center which can offer the ordering of and payment for goods and services to detainees in real-time.

BACKGROUND

Inmates at prisons and jails are typically subject to tight restrictions on their ability to contact people outside the facility. These restrictions exist in part to prevent inmates from contacting victims and witnesses of crimes for which they are accused or convicted. The limitations on outside contact are also intended to prevent inmates from conducting criminal activities or contacting current and former gang members and partners in crime while the inmate incarcerated.

A prison telephone system may be available in the facility to allow inmates to make calls to permissible telephone numbers. The inmates are usually allowed to make telephone calls to family, friends and other persons using the prisoner phone system at the discretion of the prison staff. Certain telephone numbers are restricted from inmate calls for legal, operational and security reasons. Inmates are required to provide a list of the telephone numbers that they desire to use while in custody. If approved by the prison staff, these telephone numbers are added to the inmate's Pre-Approved Number (PAN) list. This list will contain numbers for family, friends, and attorneys, for example. There may be a limitation on how many telephone numbers are allowed on the PAN list and/or how many of the numbers may be changed within any month. The inmates are restricted to calling only telephone numbers on the PAN list or approved open numbers, such as an inmate tip line or help line.

Each inmate on first admission to prison will have a personal account created, known as a prisoner account, to maintain the inmate's funds. Any money in the possession of the inmate is credited to this account. Additional funds may be added to the account whenever money is received by the prisoner from friends or family and from wages paid to the prisoner for work he performs while in custody.

Inmates may use the money held in their accounts to purchase goods and services through the prison or vendor commissary which may also include telephone calls. As well, inmates may be allowed to purchase items from an approved list of goods not stocked in the commissary, such as flowers and gifts, for friends and family members outside the facility. The funds for such purchases are deducted from the prisoners' accounts.

In some facilities, prisoners order items from a bubble sheet, phone, or kiosk a selection of goods offered by a commissary service. A contract service provider may handle the supply of commissary goods under contract with the prison. The inmates may purchase goods using these mediums on a weekly or more frequent basis. Inmate orders are passed to the commissary operator. The items in the accepted orders are collected, placed inside sealed bags and then delivered to the inmates.

In this embodiment, inmates can be routed to an IVR or call center from an inmate telephone system for the purchase of goods and services. The cost for calls made by the inmate is deducted from the inmate's account or from a separate telephone account, such as a prepaid calling account. Each time the inmate makes a call the telephone system logs the call and deducts money from the inmate's account at the appropriate call rate. Inmate calls will typically be recorded.

Upon release from prison, the inmate's trust and calling accounts are closed and the funds are returned to the inmate.

SUMMARY

Embodiments of the invention are directed to the process by which detainees in a correctional facility are routed to a specified vendor IVR or vendor call center which can offer the ordering and payment of goods and services to detainees in real-time. The IVR and call center services inmate calls and coordinates inmate purchases of goods and services. The call center is staffed by live operators who are connected to the inmates. The operators are provided with inmate data, such as personal and family information and sentencing data. A vendor agent terminal displays the inmate data and based upon that information, the operator or IVR may suggest goods and services of interest to the inmate or detainee.

The inmate may be charged a fee to access the live-operator service. The vendor call center or a detention facility call processing system may provide warnings to the inmate regarding an elapsed call duration, a time remaining on the call, or a fee amount due to continue the call.

BRIEF DESCRIPTION OF THE DRAWINGS

Figure 1:
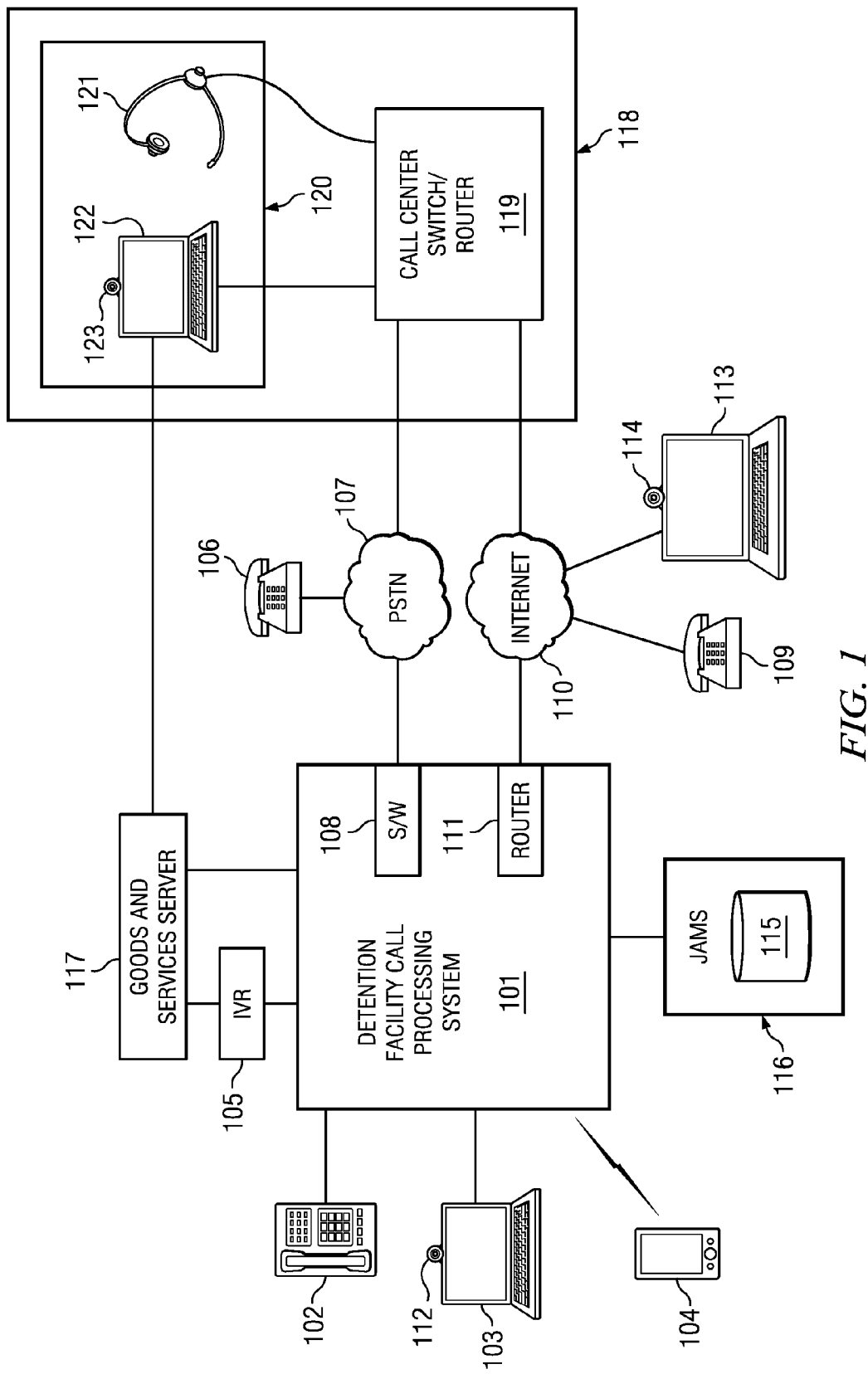
Figure 2:
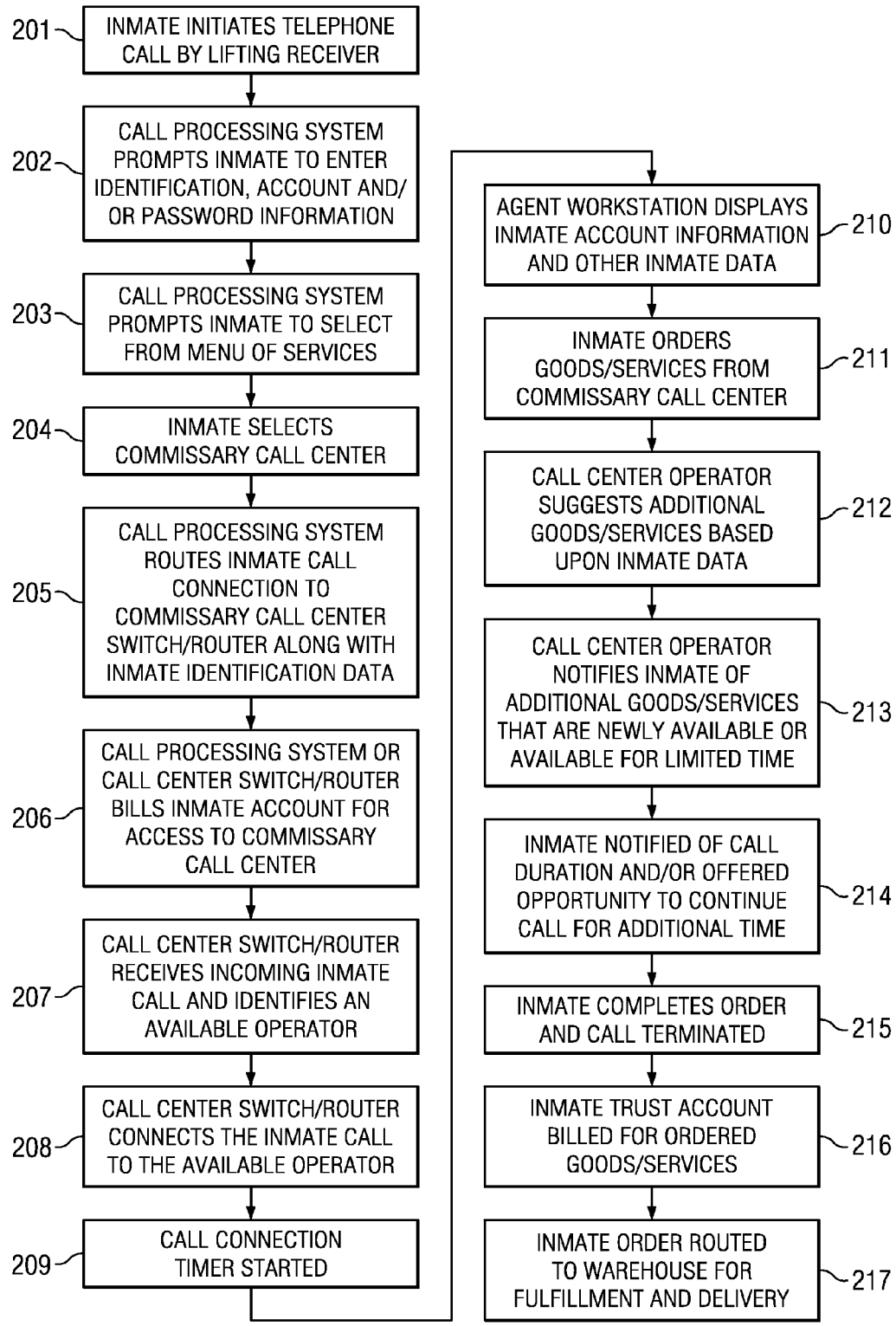

Having thus described the invention in general terms, reference will now be made to the accompanying drawings, which are not necessarily drawn to scale, and wherein:

FIG. 1 is a high-level block diagram of a system for providing a call center with live operators who interact with inmates for the purchase of goods and services; and FIG. 2 is a flowchart illustrating a process for providing inmate call center services according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a high-level block diagram of a system for providing a call center with live operators who interact with inmates for the purchase of goods and services. Call processing system 101 provides telephone services to one or more correctional facilities, such as a prison, jail, detection facility, boot camp or the like. Call processing system 101 may be located at a particular correctional facility for which it provides calling services. Alternatively, call processing system 101 may be centrally or remotely located with respect to one or more correctional facilities and may provide calling services to multiple correctional facilities. In particular, call processing system 101 provides telephone services to inmates, prisoners, detainees, arrestees or other individuals that are restricted to and a resident of a correctional facility.

Inmates use telephone 102 to access telephone services. In some facilities, inmates may also use a personal computer or kiosk 103 or wireless device 104 to access telephone services. An inmate initiates telephone services by lifting the receiver on telephone 102, at that time the inmate may be prompted to provide a personal identification number (PIN), other identifying information or biometrics. Call processing system 101 may include an interactive voice response (IVR) unit 105 that generates and plays prompts or other messages to inmates on telephones 102 and 104 or on personal computer 103.

Under the control of call processing system 101, telephones 102, 104 and computer terminal or kiosk 103 may be connected to friends and family at telephone 106 across a publicly switched telephone network (PSTN) 107. Telephone 107 may be located at a home, inmate visitation center, or other facility. Switch 108 in call processing system 101 is used to connect calls across PSTN 107. In an alternative arrangement, the inmate's friends and family may be at telephone 109, which is on a Voice over IP (VoIP) or packet data network 110. Router 111 in call processing system 101 is used to route data packets associated with a call connection to destination telephone 109. The terms switch and router are intended to be used interchangeable herein. The terms switch and router as used in the description of the call center system are both intended to cover a device that connects circuit-switched and packet-switched telephone call connections.

The inmate and called party may also communicate via video call. Computer or kiosk 103 may have a camera 112, and a called party may have a personal or laptop computer 113 with a camera 114. The video call connection between the parties maybe established and supported by an organization or commercial service that provides computer services and software for use in telecommunications and VoIP, such as SKYPE®. Alternatively, the correctional facility and the destination may use H323 videoconferencing equipment.

Call processing system 101 ensures that the inmate's calls are connected only to numbers on an approved PAN list. Each inmate's PAN list may be stored, for example, in an inmate profile in a database 115. The PAN list and other inmate profile data may be maintained by a jail administration and management system (JAMS) 116. The inmate profile data may include balances for inmate trust and calling accounts; trial schedule; conviction data; criminal record; sentencing data, such as time served, time remaining to be served, and release date; cell and cellmate assignments; inmate restrictions and warnings; order history; telephone call history; call recordings; known or suspected gang or criminal affiliations; known or suspected affiliates, accomplices, or gang members; and any other information that is relevant or useful to correctional facility staff to house and maintain inmates.

In one embodiment, inmates may use telephones 102, 104 and/or computer/kiosk 103 to order goods or other items. Good and service server (GSS) 117 maintains a list of goods available for inmate purchase and inmate orders. GSS 117 may be located at the correctional facility or remote from the facility. The GSS may serve one or more facilities and may be operated by the correctional facility itself or by a commercial vendor. Inmates may access GSS 117 using computer/kiosk 103, for example. An inmate logs-in using a PIN or identifier associated with his or her account. The GSS 117 provides a list of items that the inmate may purchase on computer/kiosk 103, 102, and 104. The list of items may be filtered to include only in-stock items, but may also include back-order, special-order, seasonal and holiday items.

The list of items displayed for the inmate may be selected based upon data stored in the inmate's profile on JAMS database 115. The correctional facility staff may designate certain types of items as restricted on a per-inmate basis. The level of funds available in the inmate's account may also be used to filter the items displayed to the inmate. Items with a cost that is more than a percentage of the inmate's available funds (for example, individual items costing more than 50%, 100%, or 200% of the account balance) are not offered to the inmate in some embodiments.

The items offered for purchase to a particular inmate may also be selected or filtered based upon the time remaining on the inmate's sentence. Inmates with a relatively short time remaining or with an expected release date that falls within a predetermined range may be offered items or services that are associated with release and reintroduction to society, such as job search books or services, or apartment location services. Inmates with a relatively longer time remaining may be offered items or services that are useful for passing the time in the correctional facility, such as entertainment goods and services (e.g. televisions, radios, digital music players, music and video recordings), or vocational training manuals or programs.

In another embodiment, inmates call a call center 118 and talk to live agents to order goods. 118 comprises call center switch/router 119, which directs incoming inmate calls to an agent station 120, which are staffed by trained operators. Agent station 120 may include a telephone or headset 121 that allows an operator to talk to an inmate live and in real-time. Agent station 120 also includes an agent workstation 122 that displays inmate and goods/services data to the operator. Any number of agent stations 120 may be supported by call center switch/router 119. The agent stations 120 may be physically located in one or more designated call center facilities. Alternatively, some or all of the operators may work from separate locations, such as their home. Call center switch/router 119 may treat the remote operators as part of a virtual call center by distributing incoming inmate calls as if all the operators were at co-located agent stations 120.

Current inmate commissary solutions are highly limited and require either that the inmate visits the facility's commissary or that the inmate fills out an order sheet listing commissary items for sale. Items selected on a commissary order sheet are delivered to the inmate within a few days from a commissary service. The inmates do not directly interact with commissary staff outside the prison facility. Similarly, current inmate calling capabilities are highly limited so that the inmates are only allowed to call telephone numbers on a PAN list. In some facilities, the inmate may be able to call a tip line to report crime tips or a help line to report problems with the telephones or the facility. However, these tip lines only allow inmates to leave a recorded message. The inmate is not allowed to directly contact a service provider, counselor, or vendor. The recorded messages are later played back by facility staff or an external vendor, who address the recorded tips or problems.

In one embodiment, inmates are allowed to contact call center 118 to order items from live operators. An inmate initiates a call using a wireline or wireless telephone 102, 104. Call processing system 101 may initially connect the inmate to IVR 105, which offers the inmate a number of options, such as "press 1 to make a call, press 2 to report facility problems, press 3 to contact a vendor agent." When the inmate enters the designated digit "3," a call connection is initiated to call center 118. It will be understood that any series of messages may be played to the inmate, or that the inmate may initiate a call using any other process, including dialing a vendor service telephone number. The inmate may receive a further message when vendor services are selected, such as a warning that the call will be monitored, a notification that a fee will be charged to access the service, and/or a warning that the call will be terminated if any offensive conduct occurs and such.

The inmate's call is received at call center switch/router 119, which identifies an available agent station 120 and routes the inmate call to the operator or agent at the available station. The operator at agent station 120 either receives the inmate's identification or the inmate may be required to provide identification, such as a name, account number, and password or PIN, when the call is initiated. Using the inmate's identification, the operator accesses the inmates account on workstation 122. Alternatively, the inmate's account information may be automatically displayed on workstation 122 using the identification information previously provided by the inmate. The information displayed to the operator may include data from the JAMS inmate database 115 in addition to an account balance.

The inmate may order specific items from the call center operator, such as items the inmate has ordered before or is aware are available from the vendor call center. Additionally, the operator is able to suggest goods and services to the inmate based on the inmate data that is displayed on workstation 122, based on frequently purchased items, and/or based on the availability of seasonal/holiday items or special offers.

Because inmates are typically not allowed to speak with people outside the prison other than the limited group on an approved PAN list, the inmate may try to keep talking to the operator without ordering any goods/services. To compensate for this situation, the commissary call center may charge the inmate based upon the duration of the call. For example, the inmate may be warned that an initial connection fee applies to a limited period, such as three or four minutes, and that any additional time will be charged to the inmate's account. Alternatively, the inmate may be charged on a per minute basis for the entire call in addition to any initial connection fee. Periodically or occasionally, the inmate may be warned that a certain amount of time has passed or that a certain amount of time is remaining for the call.

Agent station 120 may also include a camera 123 allowing the inmate and agent to communicate by video conference as well as by telephone.

Given the unique situation of the inmate call center, usual concepts of customer service may be viewed as having low value and, in fact, may not be required at all. The customer base of inmates has very limited options and, in some facilities, access to the commissary call center may be an inmate's only opportunity to obtain good/services. Accordingly, the call center operator or agent may be empowered to drop an inmate call at anytime, with or without completing the inmate's order. If an inmate was rude, obnoxious, threatening, unintelligible, or otherwise offensive, the call center agent may terminate the call connection.

FIG. 2 is a flowchart illustrating a process for providing inmate call center services according to one embodiment. In step 201, an inmate initiates a telephone call by lifting the receiver on a telephone, which may be a wireline or wireless telephone used by inmates in a correctional facility. In step 202, the call processing system prompts the inmate to enter identification, account and/or password information or biometrics. The inmate may identify an inmate trust account, a calling account or other source of payment. In step 203, the call processing system prompts the inmate to select from a menu of services, such as initiating a telephone call, obtaining facility information, or accessing a call center. When the inmate selects the vendor call center in step 204, the call processing system routes the inmate call connection to a switch or router in a call center along with the inmate's identification data in step 205.

In step 206, the call processing system or the call center switch/router bills the inmate account for access to the call center. For example, the inmate may be charged for the initial connection to the call center and all other purchases are an additional charge. In step 207, the call center switch/router receives the incoming inmate call and identifies an available operator. The call center switch/router connects the inmate call to the available operator in step 208. In step 209, a call connection timer may be started. The inmate may have a limited period of access to the call center for the initial connection. The timer may determine when the inmate's time has expired. Alternatively, the inmate may be charged for how long he accesses the call center, and the timer may be an elapsed timer that determines how long the inmate call has lasted.

In step 210, the agent workstation displays inmate account information and other inmate data for the operator or agent. In step 211, the inmate orders goods and services from the call center. The inmate may know what goods and services that he or she wants, or the inmate may refer to a catalog or other reference. In step 212, the call center operator may suggest additional goods and services that the inmate may be interested in purchasing. The operator's suggestions may be made based upon inmate data displayed on the agent workstation. For example, an order history may be displayed to the agent, and the agent may suggest previously ordered items or items that are similar to previous purchases. The displayed data may indicate a remaining duration of the inmate's sentence. If below a predetermined length the agent may suggest items of interest to the inmate based upon an upcoming or anticipated release date.

In step 213, the operator may suggest additional goods/services that are newly available or available for limited time. During holiday periods or special occasions, the operator may suggest additional items for the inmate. The inmate data may indicate key events for the inmate or the inmate's family, such as birthdays and anniversaries. The display may also indicate services that may interest the inmate, such as flower delivery services during Mother's Day, which the operator or IVR may offer.

In step 214, the inmate is notified of current call duration. This may be a warning played to the inmate that indicates an elapsed time or charge for the current call. Alternatively, a message may be played offering the inmate an opportunity to continue the call for an additional time at an additional cost. In step 215, the inmate completes his or her order and the call is terminated. The inmate's account billed for ordered goods and services in step 216. Finally, the inmate's order is routed to a warehouse or similar facility for fulfillment and delivery in step 217.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A call center system for providing goods and services to inmates, comprising:
   a call center switch coupled to a inmate communications processing system at a detention facility and to a plurality of agent stations, the processing system providing communication services only to inmates at the detention facility;
   the agent stations comprising a workstation or phone terminal and a communication connection, the agent station terminal coupled to a server and offering goods or services available for purchase by the inmates, and the connection allowing an IVR or live operators to speak with inmates in real-time; and
   the workstation terminal further coupled to an inmate database, the workstation terminal displaying inmate data obtained from the detention facility related to an inmate account.

2. The call center system of claim 1, further comprising:
   a camera adapted to provide video conference data to the call processing system.

3. The call center system of claim 1, wherein the workstation terminal provides a selected inmate's prior commissary orders.

4. The call center system of claim 1, wherein the workstation terminal provides an account balance for an inmate account.

5. The call center system of claim 1, wherein the workstation terminal provides friend and family information for a selected inmate.

6. The call center system of claim 1, wherein the workstation terminal provides information associated with a selected inmate's sentence or conviction record.

7. The call center system of claim 1, further comprising an interactive voice response (IVR) unit, the IVR adapted to play messages to the inmates.

8. A method for providing services to inmates, comprising:
   establishing a connection between an inmate telephone and a vendor agent workstation in real-time;
   displaying an inmate account profile to an agent at the agent workstation, the account profile comprising information about funds available from an inmate account and personal information about an inmate;
   displaying, on the agent workstation, a list of items available for purchase by the inmate; and
   creating an inmate order of items to be delivered to the inmate.

9. The method of claim 8, further comprising:
   sending the inmate order to a vendor company to be filled and delivered.

10. The method of claim 8, further comprising:
    timing a duration of a call between the inmate and the agent.

11. The method of claim 10, further comprising:
    charging the inmate account a fee based upon the duration of the call.

12. The method of claim 8, further comprising:
    charging the inmate account a fee for establishing the telephone call connection.

13. The method of claim 8, wherein the personal information comprises information about the inmate comprises information associated with the inmate's family.

14. The method of claim 8, wherein the personal information comprises information about the inmate comprises information associated with the inmate's sentencing and conviction record.

15. The method of claim 8, further comprising:
    displaying, on the vendor agent workstation, a list of items previously purchased by the inmate.

16. A method for providing services to an inmate, comprising:
    initiating a communications to a call center from a detention facility;
    establishing a connection between an inmate and a call center agent;
    sending inmate account information to a call center workstation, the account information including an inmate account balance;
    billing the inmate account a connection fee for establishing the call connection to the call center agent; and
    billing the inmate account a purchase amount corresponding to items ordered by the inmate from the vendor call center.

17. The method of claim 16, further comprising:
    timing a duration of the call to the call center; and
    billing the inmate account a duration fee based upon the duration of the call connection.

18. The method of claim 16, further comprising:
    sending inmate profile data to the call center workstation, the inmate profile data comprising information about the inmate's family.

19. The method of claim 16, further comprising:
    sending inmate profile data to the call center workstation, the inmate profile data comprising information about the inmate's sentence.

20. The method of claim 16, further comprising:
    sending inmate profile data to the call center workstation, the inmate profile data comprising information about the inmate's family.

* * * * *